US010882137B2

(12) United States Patent
Kitani et al.

(10) Patent No.: US 10,882,137 B2
(45) Date of Patent: Jan. 5, 2021

(54) THREE-DIMENSIONAL MANUFACTURING METHOD AND THREE-DIMENSIONAL MANUFACTURING APPARATUS

(71) Applicant: CANON KABUSHIKI KAISHA, Tokyo (JP)

(72) Inventors: Koji Kitani, Chofu (JP); Tomoyasu Mizuno, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 753 days.

(21) Appl. No.: 15/456,819

(22) Filed: Mar. 13, 2017

(65) Prior Publication Data
US 2017/0282296 A1 Oct. 5, 2017

(30) Foreign Application Priority Data
Mar. 31, 2016 (JP) ................. 2016-073538

(51) Int. Cl.
*B23K 26/12* (2014.01)
*B22F 3/00* (2006.01)
(Continued)

(52) U.S. Cl.
CPC .............. *B23K 26/123* (2013.01); *B22F 3/00* (2013.01); *B22F 3/1055* (2013.01); *B22F 3/16* (2013.01);
(Continued)

(58) Field of Classification Search
CPC .......... B22F 2003/1057; B22F 2999/00; B22F 2203/11; B22F 2203/13; B22F 2003/1056;
(Continued)

(56) References Cited

U.S. PATENT DOCUMENTS 7,635,825 B2   12/2009  Larsson
9,073,265 B2    7/2015  Snis
(Continued)

FOREIGN PATENT DOCUMENTS

CN        1726109 A    1/2006
CN      102328081 A    1/2012
(Continued)

OTHER PUBLICATIONS

First Office Action in Chinese Application No. 201710189758.8 (dated Mar. 4, 2019).

(Continued)

*Primary Examiner* — Dana Ross
*Assistant Examiner* — Joseph W Iskra
(74) *Attorney, Agent, or Firm* — Venable LLP

(57) ABSTRACT

Three-dimensional manufacturing method and apparatus which easily adjust individually a heating amount per unit area for each of solidified and unsolidified regions is provided. Light source and scanning unit heat with a laser beam a layer formed by a layer forming unit. In a layer forming step, a controlling unit causes the layer forming unit to form a layer of material powder. In a laser heating step, the controlling unit controls the light source and the scanning unit to alternately heat with the laser beam the solidified region obtained by fusing and solidifying the layer and the unsolidified region adjacent to the solidified region, thereby integrally fusing and solidifying the solidified region and the unsolidified region.

9 Claims, 11 Drawing Sheets

(51) Int. Cl.
*B22F 3/16* (2006.01)
*B33Y 10/00* (2015.01)
*B23K 26/354* (2014.01)
*B22F 3/105* (2006.01)
*B33Y 50/02* (2015.01)
*B23K 26/342* (2014.01)
*B33Y 30/00* (2015.01)

(52) U.S. Cl.
CPC .......... *B23K 26/342* (2015.10); *B23K 26/354* (2015.10); *B33Y 10/00* (2014.12); *B33Y 30/00* (2014.12); *B33Y 50/02* (2014.12); *B22F 2003/1056* (2013.01); *B22F 2003/1057* (2013.01); *B22F 2999/00* (2013.01); *Y02P 10/25* (2015.11)

(58) Field of Classification Search
CPC . B22F 3/00; B22F 3/1055; B22F 3/16; B23K 26/123; B23K 26/342; B23K 26/354; B33Y 10/00; B33Y 30/00; B33Y 50/02; Y02P 10/295
USPC .................................................... 219/121.86
See application file for complete search history.

(56) References Cited

U.S. PATENT DOCUMENTS

| | | |
|---|---|---|
| 9,399,321 B2 | 7/2016 | Ljungblad et al. |
| 9,851,634 B2 | 12/2017 | Matsuda et al. |
| 10,337,335 B2 | 7/2019 | Pavlov et al. |
| 2006/0157454 A1* | 7/2006 | Larsson ................ B29C 64/153 219/121.8 |
| 2006/0192322 A1* | 8/2006 | Abe ....................... B22F 3/1055 264/497 |
| 2012/0329659 A1* | 12/2012 | Holcomb ................. B22F 3/00 505/400 |
| 2014/0332507 A1 | 11/2014 | Fockele |
| 2015/0367573 A1 | 12/2015 | Okazaki et al. |
| 2016/0303687 A1 | 10/2016 | Ljungblad et al. |
| 2017/0341183 A1* | 11/2017 | Buller .................... B33Y 30/00 |

FOREIGN PATENT DOCUMENTS

| | | |
|---|---|---|
| CN | 102470439 A | 5/2012 |
| CN | 103732380 A | 4/2014 |
| CN | 104067373 A | 9/2014 |
| JP | 2010-132961 A | 6/2010 |
| JP | 2014-508668 | 4/2014 |
| JP | 2014-508668 A | 4/2014 |
| JP | 5721886 B1 | 5/2015 |
| JP | 2015-157405 A | 9/2015 |
| JP | 2015-166178 | 9/2015 |
| JP | 2015-166178 A | 9/2015 |

OTHER PUBLICATIONS

Mizuno et al., U.S. Appl. No. 15/456,808, filed Mar. 13, 2017.
Notification of Reasons for Refusal in Japanese Application No. 2016-073538 (dated Mar. 17, 2020).

* cited by examiner

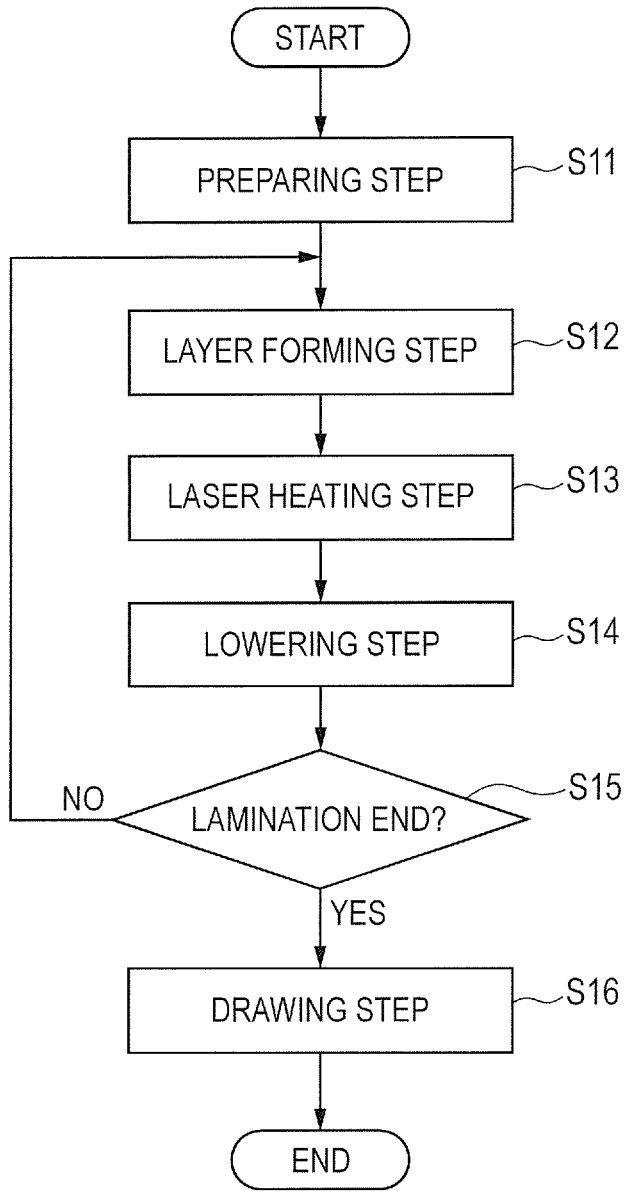

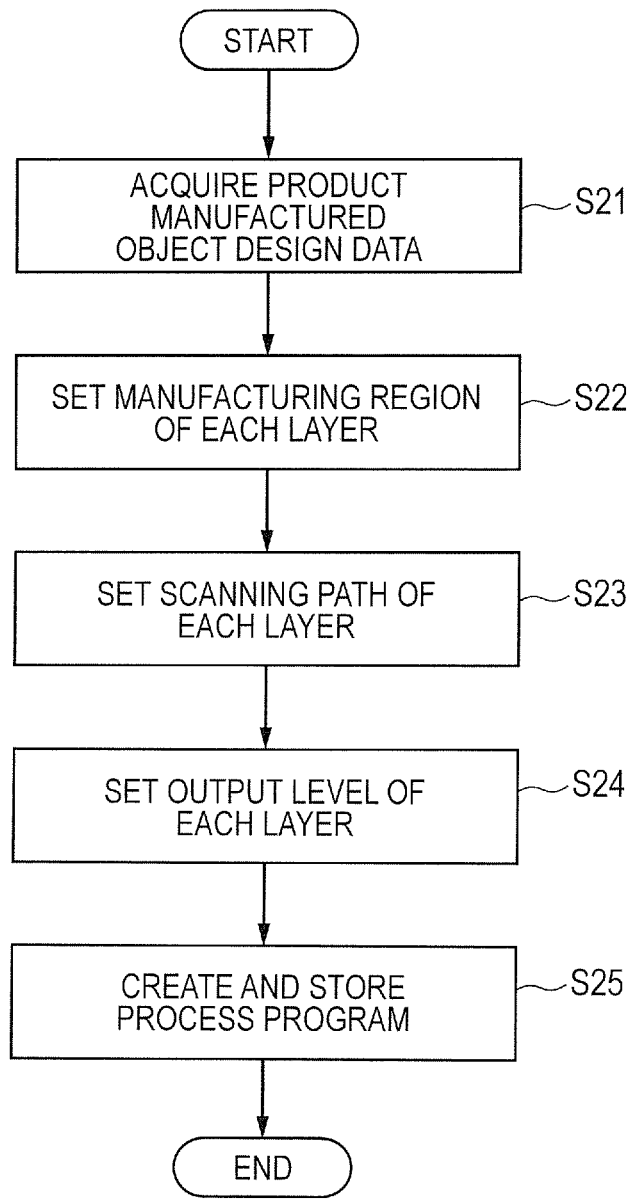

THREE-DIMENSIONAL MANUFACTURING METHOD AND THREE-DIMENSIONAL MANUFACTURING APPARATUS

BACKGROUND OF THE INVENTION

Field of the Invention

The present invention relates to a three-dimensional manufacturing method and a three-dimensional manufacturing apparatus which manufacture a three-dimensional manufactured object by using an energy beam.

Description of the Related Art

In recent years, a three-dimensional manufacturing method of manufacturing a three-dimensional manufactured object by a powder bed fusion (melting and bonding) technique of performing a heating process using an energy beam is being developed. In the powder bed fusion technique in which the heating step is performed using the energy beam, fine powder called fume in which material powder evaporated by the energy beam has been solidified within an apparatus becomes a problem.

Japanese Patent Application Laid-Open No. 2010-132961 discloses that a flow of inert gas is formed within an apparatus, and fume generated in the apparatus is expelled from the inside of the apparatus. Besides, Japanese Patent No. 5721886 discloses a fume sucking unit is provided in a layer forming unit of forming a powder bed.

Since the technique disclosed in each of Japanese Patent Application Laid-Open No. 2010-132961 and Japanese Patent No. 5721886 intends to alleviate the influence of the fume on the premise that the fume is inevitably generated in the process of manufacturing a three-dimensional manufactured object, it is essentially impossible to reduce the total amount itself of the fume generated in the manufacturing process of the three-dimensional manufactured object.

Incidentally, in the conventional powder bed fusion technique of performing the heating process using the energy beam, the energy beam is moved such that the beam spot thereof overlaps both a solidified region being fused and solidified and an unsolidified region being adjacent to the solidified region. That is, the beam spot is moved along the boundary between the solidified region and the unsolidified region, to simultaneously fuse both the solidified region and the unsolidified region and integrate them.

Here, in the unsolidified region of a powder state, fume tends to occur more easily than the solidified region where heat is easily diffused due to solidification. Therefore, it was proposed to set the heating amount per unit area in the unsolidified region to be lower than that in the solidified region. However, when the beam spot is moved along the boundary between the solidified region and the unsolidified region, it is difficult to individually adjust the heating amount per unit area for each of the solidified region and the unsolidified region.

SUMMARY OF THE INVENTION

It is an object of the present invention to provide a three-dimensional manufacturing method and a three-dimensional manufacturing apparatus which can easily adjust a heating amount per unit area for each of a solidified region and an unsolidified region individually.

A three-dimensional manufacturing method according to the present invention is an object manufacturing method which comprises: a layer forming step of causing a controlling unit to form a layer of material powder; and a heating step of causing the controlling unit to alternately heat a solidified region obtained by fusing and solidifying the layer formed in the layer forming step and an unsolidified region adjacent to the solidified region while moving an energy beam, thereby integrally fusing and solidifying the solidified region and the unsolidified region.

A three-dimensional manufacturing apparatus according to the present invention comprises: a layer forming unit configured to be able to form a layer of material powder; a heating unit configured to heat, with a laser beam, the layer formed by the layer forming unit; and a controlling unit configured to cause the layer forming unit to form the layer, and cause the heating unit to heat the layer. Besides, the controlling unit is configured to alternately heat a solidified region obtained by fusing and solidifying the layer and an unsolidified region adjacent to the solidified region while moving the energy beam, thereby integrally fusing and solidifying the solidified region and the unsolidified region.

According to the present invention, it is possible to provide the three-dimensional manufacturing method and the three-dimensional manufacturing apparatus which can easily adjust the heating amount per unit area for each of the solidified region and the unsolidified region individually. Hereby, it becomes possible to individually adjust the heating amount per unit area for each of the solidified region and the unsolidified region, and thus reduce the total amount of fume itself generated in the process of manufacturing a three-dimensional manufactured object.

Further features of the present invention will become apparent from the following description of exemplary embodiments with reference to the attached drawings.

BRIEF DESCRIPTION OF THE DRAWINGS

FIG. 3 is a flow chart of a manufacturing process of a three-dimensional manufactured object.

FIG. 4A is the perspective diagram for illustrating a laser beam scanning path on a layer of material powder, and FIG. 4B is the perspective diagram for illustrating the boundary heating with enlarged beam spots.

FIG. 5A is the diagram for illustrating a laser beam scanning path, and FIG. 5B is the perspective diagram for illustrating the boundary scan heating.

FIG. 6 is a flow chart of a process of creating a processing program for boundary scan heating.

FIG. 9A is the diagram for illustrating the laser beam output, and FIG. 9B is the diagram for illustrating scanning speed of the laser beam for the boundary scan heating.

FIG. 10A is the diagram for illustrating the laser beam output, and FIG. 10B is the diagram for illustrating scanning speed of the laser beam for the boundary scan heating.

FIG. 11A is the diagram for illustrating the laser beam output, and FIG. 11B is the diagram for illustrating scanning speed of the laser beam for the boundary scan heating.

DESCRIPTION OF THE EMBODIMENTS

Hereinafter, preferred embodiments of the present invention will be described in detail in accordance with the accompanying drawings.

First Embodiment

In the first embodiment, boundary scan heating is performed at the boundary between a solidified region and an unsolidified region, so that the solidified region and the unsolidified region are fused (melted) and solidified integrally. Besides, a boundary scanning speed of a laser beam in the unsolidified region is made higher than the boundary scanning speed of the laser beam in the solidified region. Hereby, it is possible to reduce occurrence of fume itself in a powder bed fusion technique.

(Three-Dimensional Manufacturing Apparatus)

Figure 1:
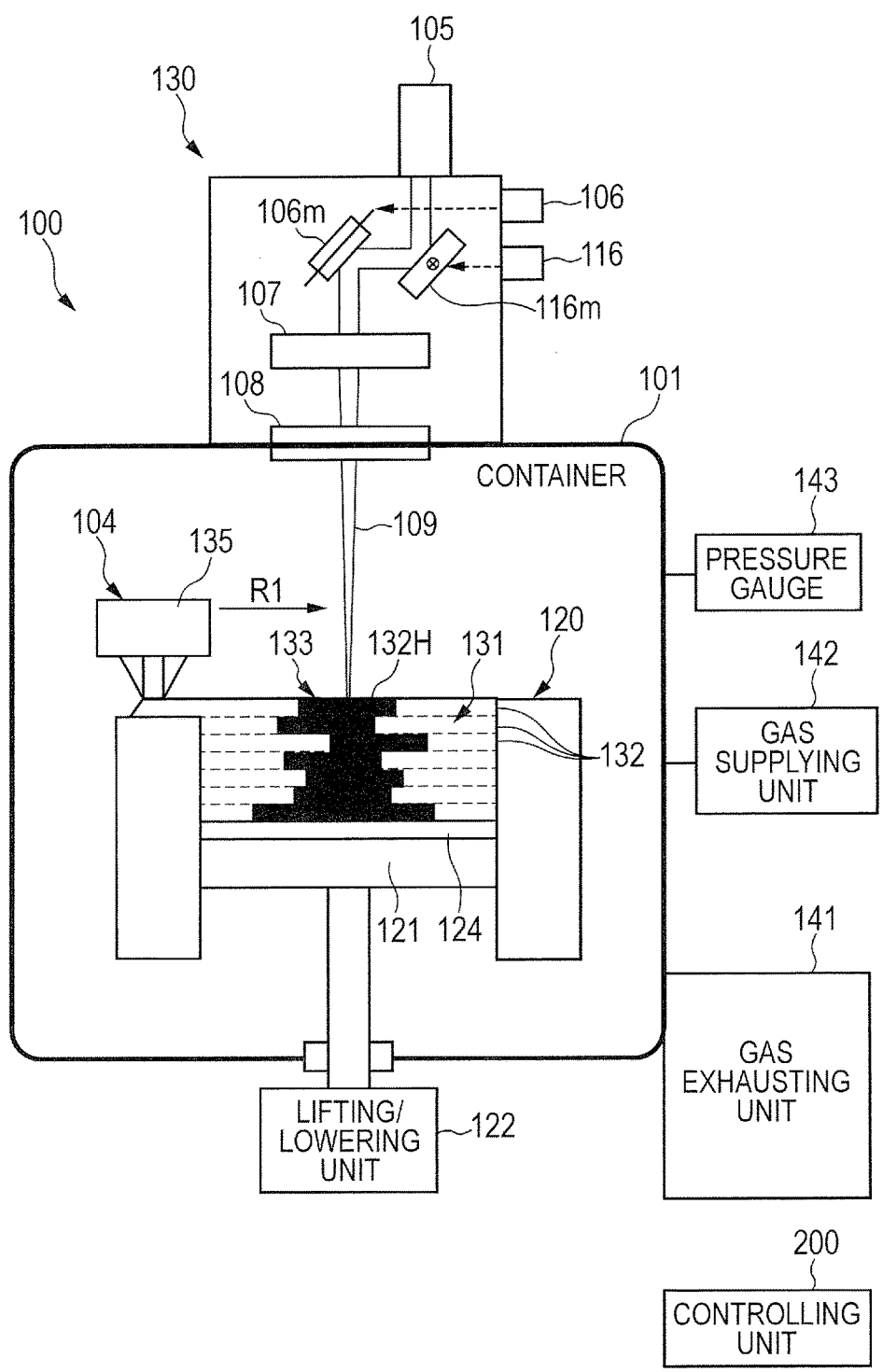
FIG. 1 is an explanatory diagram of a constitution of a three-dimensional manufacturing apparatus according to the first embodiment.

FIG. 1 is an explanatory diagram of the constitution of a three-dimensional manufacturing apparatus according to the first embodiment. A powder bed fusion technique is being developed in recent years because it is possible to produce small-quantity and wide-variety metal parts and complicated-shaped metal parts. In the powder bed fusion technique, usually, a process of forming a layer of material powder, locally fusing the formed layer by an energy beam, and uniting or combining the fused layer with another layer in the plane direction and the depth direction is repeatedly performed for many layers, and the obtained layers are then laminated to form a product manufactured object.

As illustrated in FIG. 1, a three-dimensional manufacturing apparatus 100 is a so-called 3D printer of a powder bed fusion system. A container 101 is made of stainless steel, and can be hermetically sealed. A pressure gauge 143 is connected to the container 101.

A gas exhausting unit 141 exhausts the inside of the container 101 to expel oxygen. The gas exhausting unit 141 is constituted by a dry pump. A gas supplying unit 142 can supply nitrogen gas into the container 101.

The gas exhausting unit 141 has an opening adjusting valve capable of adjusting an opening amount, at a connection portion with the container 101. The three-dimensional manufacturing apparatus 100 can maintain the inside of the container 101 to be a desired atmosphere and a desired pressure (a degree of vacuum), by adjusting the opening adjusting valve according to the output of the pressure gauge 143 while supplying gas to the container 101 by the gas supplying unit 142.

A manufacturing container 120 is disposed in the container 101. In the manufacturing container 120, a laminated base material 124 which is a substrate on which a layer 132 of material powder 131 is laminated is disposed on a table 121. A lifting/lowering unit 122 lowers the table 121 step by step at an arbitrary pitch corresponding to the thickness of the layer 132.

A layer forming unit 104 can form the layer 132 of the material powder 131 in the manufacturing container 120. The layer forming unit 104 forms the layer 132 of the material powder 131 as a moving unit 135 containing the material powder 131 moves in the direction of an arrow R1 along the upper surface of the manufacturing container 120. The layer forming unit 104 forms and laminates the layer 132 of the material powder 131 on the laminated base material 124 or the layer 132. Besides, the layer forming unit 104 forms the material powder 131 of metal powder having a particle diameter of several micrometers to several tens of micrometers with a uniform thickness of about 10 μm to 100 μm, by a squeegee, a roller or the like (not illustrated). In the first embodiment, the layer 132 having the thickness of 40 μm is formed using the material powder of SUS316 (Steel Use Stainless 316) having the particle diameter of 20 μm, by the layer forming unit 104.

A scan heat unit 130 heats, with a laser beam 109, the layer 132 formed by the layer forming unit 104 being an example of a layer forming unit. The scan heat unit 130 performs biaxial scanning by the laser beam 109 generated from a light source 105 via scanning mirrors 106m and 116m, thereby heating the solidified region corresponding to input data in the layer 132. The scan heat unit 130 heats the layer 132 of the manufacturing container 120 by the laser beam 109, almost instantaneously fuses the relevant layer, and integrally solidifies the fused layer and the solid material below the fused layer. Hereby, a desired manufactured region of the layer 132 formed in the manufacturing container 120 is changed to a solidified layer 132H.

The light source 105, which is a YAG (Yttrium Aluminum Garnet) laser oscillator, is a semiconductor fiber laser having the wavelength of 1070 nm and the output of 500 W. An optical system 107, which includes a lens for focusing the laser beam, forms the beam spot of the laser beam at the height of the layer 132. A transmission window 108 is used to transmit the laser beam 109 into the container 101.

A controlling unit 200, which is an example of a controlling unit, causes the layer forming unit 104 to form the layer 132, and causes the scan heat unit 130, which is an example of a heating unit, to heat the layer 132. The controlling unit 200 moves the laser beam 109 to alternately heat a solidified region 302 in which the layer 132 has been fused and solidified as illustrated in FIG. 5B and an unsolidified region 301 which is adjacent to the solidified region 302, thereby integrally fusing and solidifying the solidified region 302 and the unsolidified region 301.

(Manufacturing Process of Manufactured Object)

Figure 2:
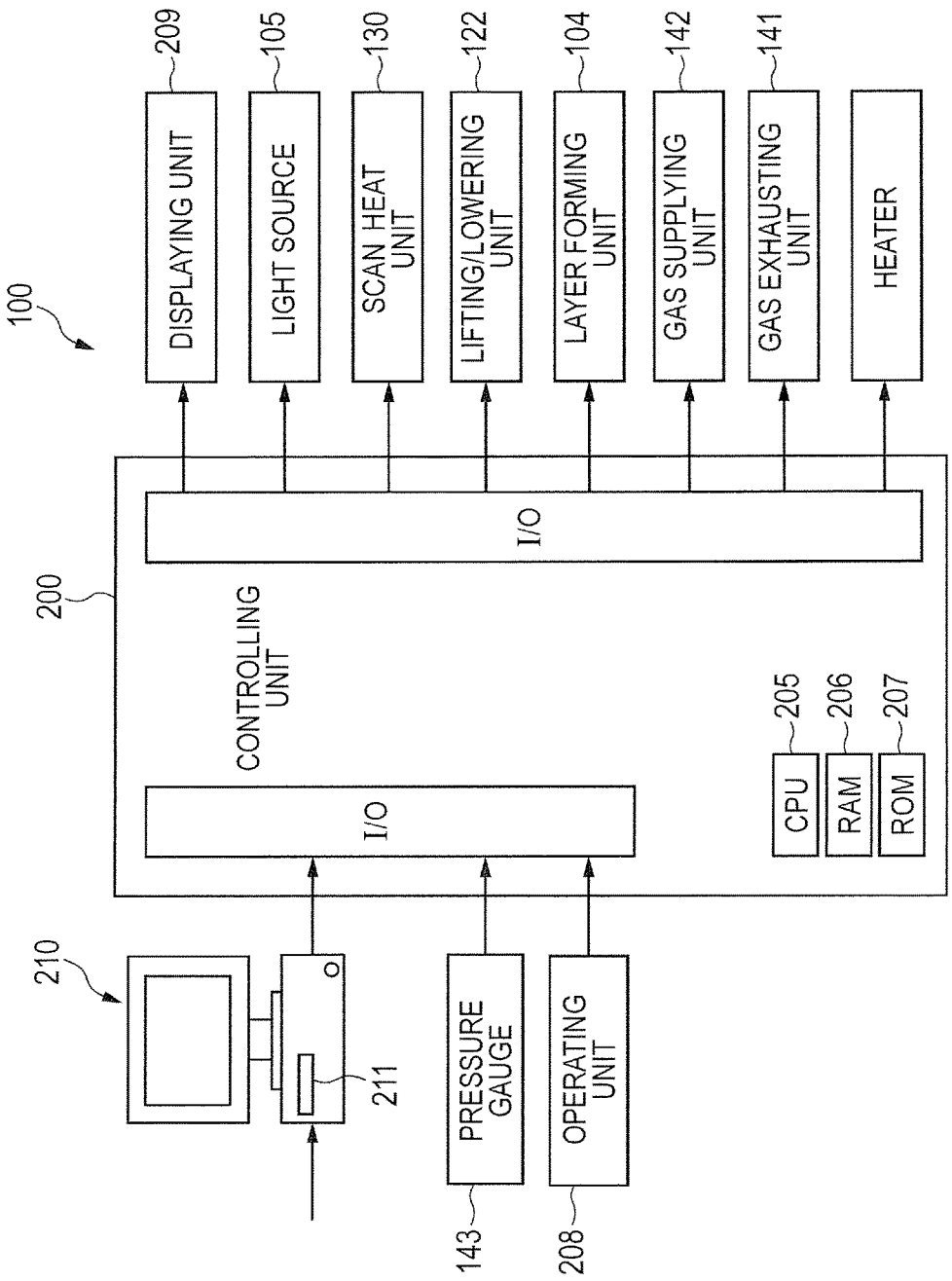
FIG. 2 is a block diagram of a controlling system of the three-dimensional manufacturing apparatus.

FIG. 2 is a block diagram for illustrating a controlling system of the three-dimensional manufacturing apparatus. FIG. 3 is a flow chart for describing a manufacturing process of a three-dimensional manufactured object. As illustrated in FIG. 1, the three-dimensional manufacturing apparatus 100 repeatedly performs a layer forming step and a laser heating step to manufacture a three-dimensional product manufactured object 133 in which the solidified layer 132H is laminated. The three-dimensional manufacturing apparatus 100 changes the moving speed of the laser beam 109 by controlling the scanning mirrors 106m and 116m, and changes the output of the laser beam 109 by controlling the light source 105.

As illustrated in FIG. 2, the controlling unit 200 holds the control program and the data for the three-dimensional manufacturing process extracted from a ROM (read only memory) 207 in a RAM (random access memory) 206, and a CPU (central processing unit) 205 performs calculation and control for the held program and data, so that the controlling unit functions as a three-dimensional manufacturing process controller. The controlling unit 200 controls the three-dimensional manufacturing apparatus 100 by executing a process program created by an external computer 210.

As illustrated in FIG. 3, when a user instructs to start the process through an operating unit 208, the controlling unit 200 performs a preparing step (S11). In the preparing step, as illustrated in FIG. 1, the gas exhausting unit 141 is operated to exhaust (or evacuate) the inside of the container 101. Then, when the pressure inside the container 101 reaches several hundred pascals (Pa), gas supply by the gas supplying unit 142 is started to set the pressure and the atmosphere in the container 101. Further, by operating the lifting/lowering unit 122 to lower the table 121, a room for forming the first layer 132 is formed on the laminated base material 124.

Upon completion of the preparing step, the controlling unit 200 performs the layer forming step (S12). In the layer forming step (S12) which is an example of a layer forming procedure, the controlling unit 200 causes to form the layer 132 of the material powder 131. In the layer forming step, as illustrated in FIG. 1, the layer forming unit 104 is operated to form the layer 132 of the material powder 131 on the laminated base material 124 or the already formed layer 132.

Upon completion of the layer forming step, the controlling unit 200 performs the laser heating step (S13). In the laser heating step (S13) which is an example of a heating procedure, the controlling unit 200 controls the laser beam 109 which is an example of the energy beam to alternately heat the solidified region 302 which has been fused and solidified in the layer 132 and the unsolidified region 301 which is adjacent to the solidified region 302. Hereby, the solidified region 302 and the unsolidified region 301 are together fused and solidified integrally. In the laser heating step, as illustrated in FIG. 1, the scan heat unit 130 and the light source 105 are operated to fuse and solidify the manufacturing region on the layer 132 by the laser beam 109. The laser heating step is performed in reduced pressure with nitrogen gas introduced or in atmosphere of atmospheric pressure. The material powder 131 which is located in the movement path of the laser beam 109 is fused and solidified, so that the surface of the layer 132 is divided into the solidified region and the unsolidified region.

Upon completion of the laser heating step, the controlling unit 200 performs a lowering step (S14). In the lowering step, as illustrated in FIG. 1, the lifting/lowering unit 122 is operated to lower the table 121, thereby forming a room for forming the next layer 132 on the layer 132 to which the laser heating step has been performed.

The controlling unit 200 repeatedly performs the layer forming step (S12), the laser heating step (S13) and the lowering step (S14), until the number of times of lamination necessary for forming the product manufactured object is reached (NO in S15). When the necessary number of times of lamination is reached (YES in S15), the controlling unit 200 performs a drawing step (S16). In the drawing step, as illustrated in FIG. 1, the gas supplying unit 142 and the gas exhausting unit 141 are stopped, outside air is supplied into the container 101 to cool the product manufactured object 133, and, after the produce manufactured objected is cooled down, it is allowed for the user to draw (or take out) the manufactured product via a displaying unit 209.

(Conventional Boundary Heating)

Figure 4A:
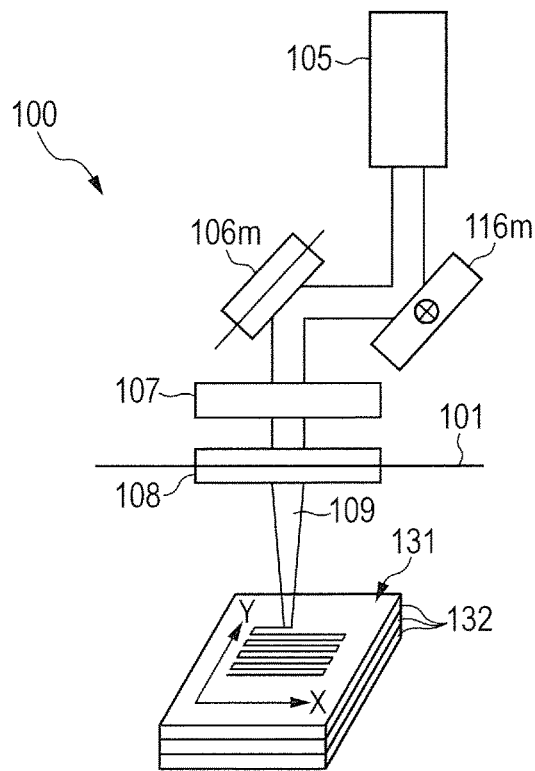
FIGS. 4A and 4B are explanatory diagrams of boundary heating in conventional scan heating. More specifically.
Figure 4B:
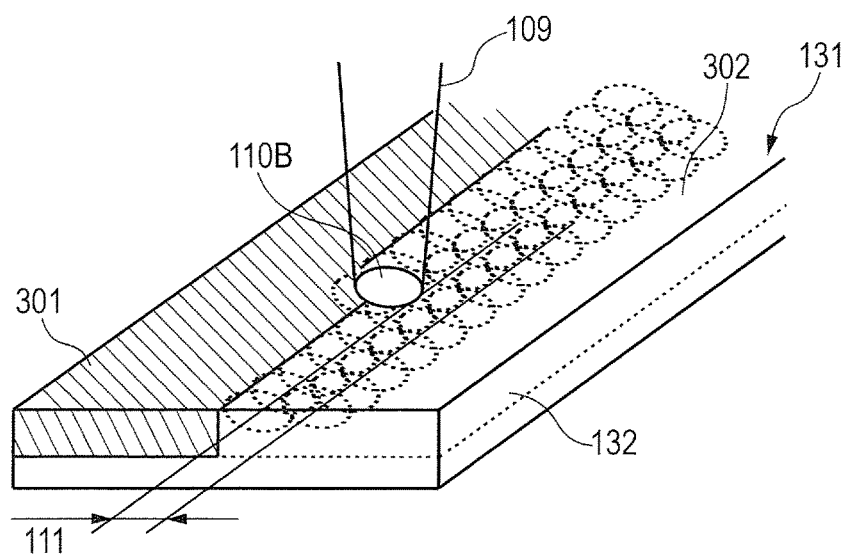

FIGS. 4A and 4B are explanatory diagrams of boundary heating in the conventional scan heating. More specifically, FIG. 4A is the perspective diagram for illustrating a laser beam scanning path on the layer of material powder, and FIG. 4B is the perspective diagram for illustrating the boundary heating with enlarged beam spots.

As illustrated in FIG. 4A, the three-dimensional manufacturing apparatus 100 uses raster scanning in which main scanning in the linear X direction is repeated over and over at an equal interval in the Y direction. By performing sub scanning of the laser beam 109 in the Y direction while performing the main scanning thereof in the X direction, the laser beam 109 is irradiated onto the surface of the layer 132 with a uniform irradiation density. Then, by repeating such scanning to the plurality of layers 132, it is possible to form the product manufactured object (133: FIG. 1) in which a solidified region 302 is laminated, into a desired shape.

As illustrated in FIG. 4B, in the laser heating step, the solidified region 302 fused and solidified in the previous main scanning, and the unsolidified region 301 not yet solidified are fused simultaneously and solidified integrally. Therefore, conventionally, a beam spot 110B having a size overlapping the solidified region 302 and the unsolidified region 301 is formed, and the laser beam 109 is scanned so that the center of the beam spot 110B moves along the boundary between the solidified region 302 and the unsolidified region 301. The diameter of the beam spot 110B is larger than a scanning pitch 111 in the main scanning, and both the solidified region 302 and the unsolidified region 301 are simultaneously heated and thus fused by the beam spot 110B. The solidified region 302 is formed into a desired shape by continuously performing a process of connecting the solidified region 302 and the unsolidified region 301 with the beam spot 110B along the main-scanning path.

(Problem of Fume)

The irradiation of the energy beam in the powder bed fusion technique is generally performed in inert gas for preventing oxidation. In the powder bed fusion technique, fine particles (called fume) are generated in the container as the material powder is heated by the energy beam in the inert gas.

As illustrated in FIG. 1, in the laser heating step, smoke called the fume is generated, when the laser beam 109 is irradiated to the layer 132 of the material powder 131 and the layer is thus heated. The fume is the fine powder which is generated in a case where metal vapor generated by sublimation or evaporation is condensed when the material powder 131 is rapidly heated. When the container 101 is filled with the fume, the fume adheres to the transmission window 108 through which the laser beam 109 is introduced into the container 101, so that the transmittance decreases. Alternatively, the fume which floats in the container 101 scatters the laser beam 109, so that the laser beam 109 reaching the layer 132 of the material powder 131 decreases. Here, when the laser beam 109 reaching the layer 132 decreases, there is a possibility that fusing of the material powder 131 may be insufficient. Therefore, in the laser heating step, it is required to suppress the generation amount of the fume.

Incidentally, thermal conductivity of the solidified region 302 in which the material powder 131 has already been fused and solidified is higher than thermal conductivity of the unsolidified region 301 of the unfused material powder 131, and the temperature of the solidified region does not rise easily when the laser beam 109 is irradiated. For this reason, it is desirable to reduce the energy of the laser beam 109 necessary for fusing the unsolidified region 301 as compared with the energy necessary for fusing the solidified region 302. As illustrated in FIG. 4B, when the solidified region 302 and the unsolidified region 301 are simultaneously heated by the common beam spot 110B, the laser beam 109 is irradiated to the unsolidified region 301 with the intensity necessary for fusing the solidified region 302. Hereby, the unsolidified region 301 is irradiated with the laser beam 109 that is larger than the level required for the fusing, the unsolidified region becomes an overheated state, and the generation amount of the fume increases.

Therefore, in the first embodiment, the boundary scan heating for scanning the beam spot 110B is performed on the boundary between the solidified region 302 and the unsolidified region 301, thereby alternately heating the solidified region 302 and the unsolidified region 301. Here, for the unsolidified region 301, the irradiation amount per unit area of the laser beam 109 is set smaller than that for the solidified region 302.

(Boundary Scan Heating)

Figure 5A:
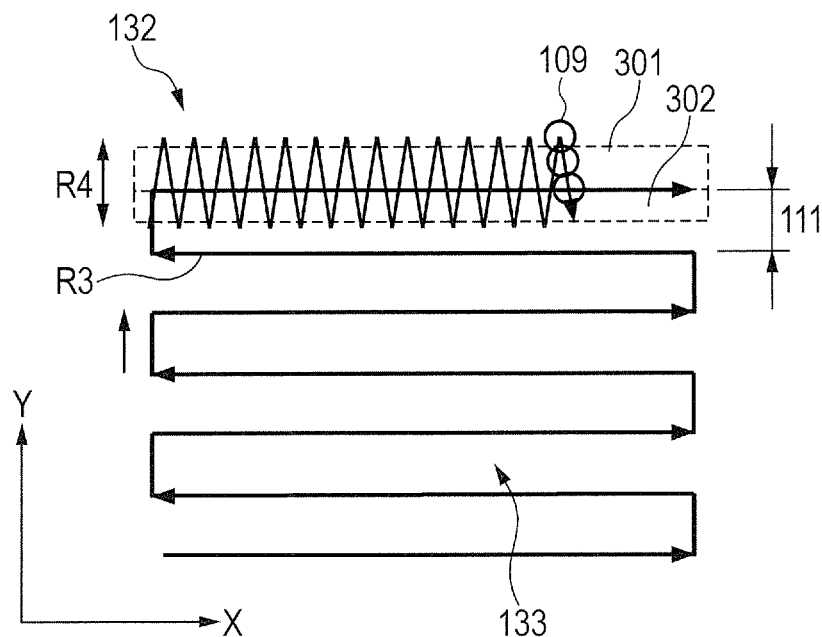
FIGS. 5A and 5B are explanatory diagrams of boundary scan heating by a laser beam. More specifically.
Figure 5B:
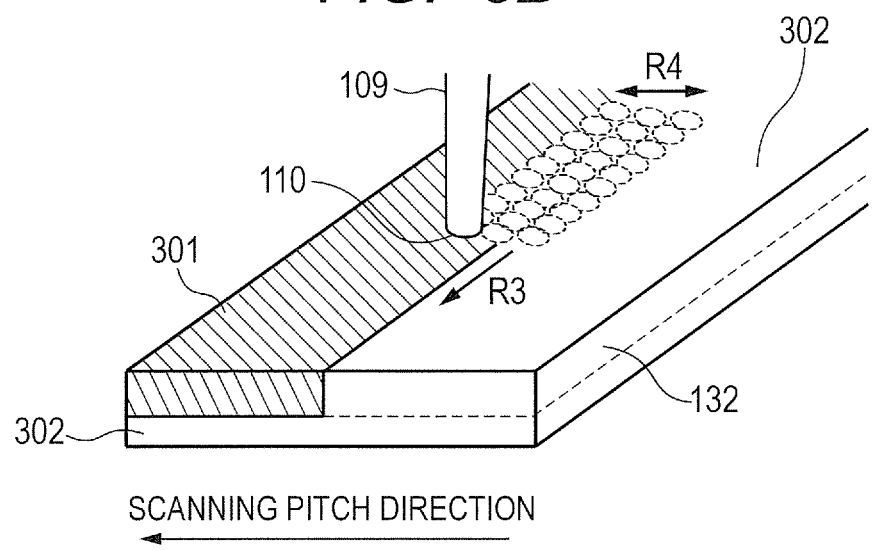

FIGS. 5A and 5B are explanatory diagrams of the boundary scan heating by the laser beam. FIG. 6 is a flow chart of a process of creating a processing program for the boundary scan heating. More specifically, FIG. 5A is the diagram for illustrating a laser beam scanning path, and FIG. 5B is the perspective diagram for illustrating the boundary scan heating.

As illustrated in FIG. 5A, in the first embodiment, the boundary scan heating is performed along with the main scanning performed for each scanning pitch 111. In the boundary scan heating, when performing the main scanning in the X direction with being shifted by the constant scanning pitch 111 in the Y direction, the laser beam 109 is reciprocated with a high frequency in the Y direction in a triangular wave form.

The beam spot 110B is moved at a high speed between the solidified region 302 and the unsolidified region 301 to alternately heat the solidified region 302 and the unsolidified region 301. The fused-and-solidified solidified region 302 and the not-yet-solidified unsolidified region 301 are alternately heated by the laser beam 109, so that the solidified region 302 and the unsolidified region 301 are fused and solidified integrally. The region to which the beam spot 110B is newly irradiated is fused, and then solidification occurs between the relevant region and the region which has been fused by the irradiation of the beam spot 110B.

Since the scanning pitch 111 is equivalent to the range which should be fused and solidified by one main scanning, the amplitude of the boundary scan heating by the beam spot 110B is made larger than the scanning pitch 111. Hereby, the solidified region 302 by the previous main scanning and the solidified region 302 by the current main scanning overlap each other to some extent, so that integration of the solidified region 302 and the unsolidified region 301 becomes reliable.

As illustrated in FIG. 5B, the diameter of a beam spot 110 is smaller than a scanning width L1 of the boundary scan heating, is smaller than the heating width of the boundary scan heating in the unsolidified region 301, and is smaller than the heating width of the boundary scan heating in the solidified region 302. Each of the beam spots 110 drawn by the dotted line schematically represents the portion where the beam spot 110 has already passed and thus fused. That is, when the diameter of the beam spot 110 is D, the heating width of the boundary scan heating in the unsolidified region 301 is L2, and the heating width of the boundary scan heating in the solidified region 302 is L3, the following relations are obtained.

$$D < L3 \leq L2 < L1$$

$$L1 = L2 + L3$$

As illustrated in FIG. 2, the external computer 210 automatically creates a manufacturing processing program of the product manufactured object 133 to be executed by the three-dimensional manufacturing apparatus 100, based on the design data of the product manufactured object 133 input from the outside, as illustrated in FIG. 6. More specifically, the external computer 210 acquires the design data (CAD (computer-aided design) data) of the product manufactured object 133 (S21). The external computer 210 sets a manufacturing region for each layer 132 based on the design data of the product manufactured object 133 (S22).

The external computer 210 sets a scanning path in the manufacturing of each layer 132 based on the manufacturing region for each layer 132 (S23). The external computer 210 sets an output level of the laser beam 109 at each point on the scanning path for each layer 132 (S24). The external computer 210 creates the manufacturing processing program of the product manufactured object 133 by combining the scanning path of the laser beam 109 for each layer 132 and the output level of the laser beam 109 with each other, and stores the created manufacturing processing program (S25).

The manufacturing processing program, which is an example of a program, is stored in a recording medium 211 of FIG. 2, and is used to cause the controlling unit 200, which is an example of a computer, to perform each of the steps of the three-dimensional manufacturing method. The three-dimensional manufacturing apparatus 100 performs the laser heating step (S13) by using the manufacturing processing program for performing the boundary scan heating, and thus manufactures (forms or models) the product manufactured object 133 having a desired shape by fusing and bonding the unsolidified region 301 and the solidified region 302 of the layer 132 of the material powder 131.

As illustrated in FIG. 4A, in the first embodiment, the rectangular-parallelepiped product manufactured object (133: FIG. 1) having the length of 20 mm in the main-scanning direction and the length of 50 mm in the sub-scanning direction is produced with the boundary scan heating. In the boundary scan heating, the unsolidified region 301 and the solidified region 302 are continuously and alternately heated.

(Heating Amount Per Unit Area)

Figure 7:
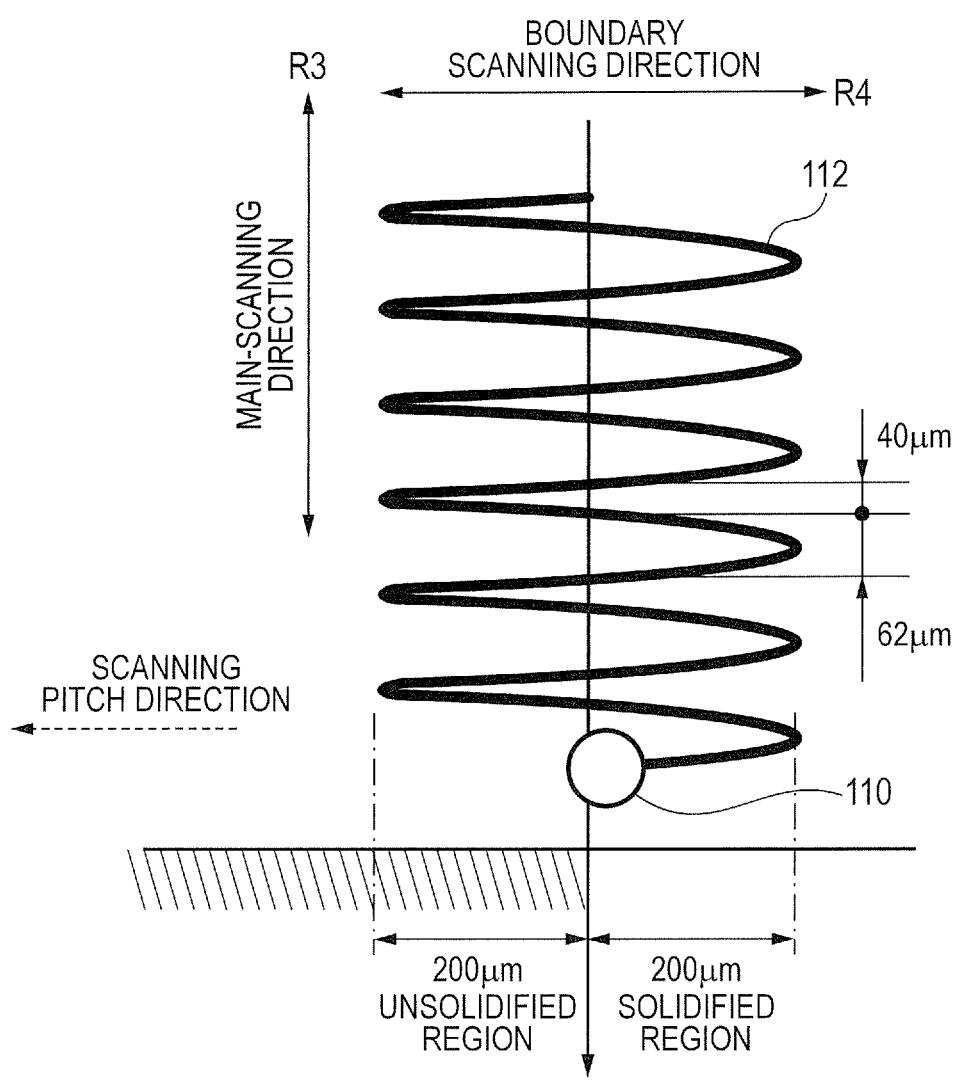
FIG. 7 is an explanatory diagram for illustrating a movement path of a beam spot in boundary scan heating.

FIG. 7 is an explanatory diagram for illustrating a movement path 112 of the beam spot in the boundary scan heating. As illustrated in FIG. 7, the beam spot 110 reciprocates in the direction of an arrow R4 along with the main scanning in the direction of an arrow R3, thereby performing the boundary scan heating. In order to suppress the generation of the fume, it is desirable for the heating energy per unit area supplied by the laser beam 109 to the layer 132 to be the minimum amount required to fuse the unsolidified region 301 and the solidified region 302 up to a desired depth.

In the boundary scan heating, the laser beam 109 is controlled such that the heating amount per unit area of the unsolidified region 301 becomes smaller than the heating amount per unit area of the solidified region 302. The heating amount per unit area of the unsolidified region 301 in the boundary scan heating is set to be smaller than the heating amount per unit area of the solidified region 302.

In the boundary scan heating, the heating energy to be supplied for fusing and solidifying the unsolidified region 301 up to a predetermined depth is made smaller than the heating energy to be supplied for fusing and solidifying the solidified region 302 up to the predetermined depth. The integrated value of irradiation energy per unit area to be given to the unsolidified region 301 is made smaller than the integrated value of the heating energy per unit area to be given to the solidified region 302.

Hereby, an increase in the fume due to the overheating of the unsolidified region 301 is avoided. By preventing the overheating of the unsolidified region 301, the generation amount itself of the fume in the laser heating step (S13) is suppressed.

In the boundary scan heating, the laser beam 109 is controlled so as to continuously irradiate the solidified region 302 and the unsolidified region 301 by using a so-called raster scanning method.

Incidentally, as a method for reducing the heating amount per unit area of the unsolidified region 301 to be smaller than the heating amount per unit area of the solidified region 302, the following examples can be considered.

(1) In the unsolidified region 301, the scanning speed of the laser beam 109 is made higher than that in the solidified region 302. In a later-described example 1, the laser beam 109 is controlled so that the average scanning speed of the laser beam 109 in the unsolidified region 301 is higher than the average scanning speed of the laser beam 109 in the solidified region 302. In a later-described second embodiment, speed reduction (deceleration) and stop at the maximum amplitude position of the scanning are performed by using the beam spot 110 having the size matching the solidified region 302. In this application, the scanning speed may be referred to as moving speed in some cases.

(2) In the unsolidified region 301, the output of the laser beam 109 is made lower than that in the solidified region 302. In later-described examples 2, 3 and 4, the laser beam 109 is controlled so that the average output of the laser beam 109 in the unsolidified region 301 is smaller than the average output of the laser beam 109 in the solidified region 302.

(3) In the unsolidified region 301, the scanning frequency of the laser beam 109 is made lower than that in the solidified region 302.

Figure 8:
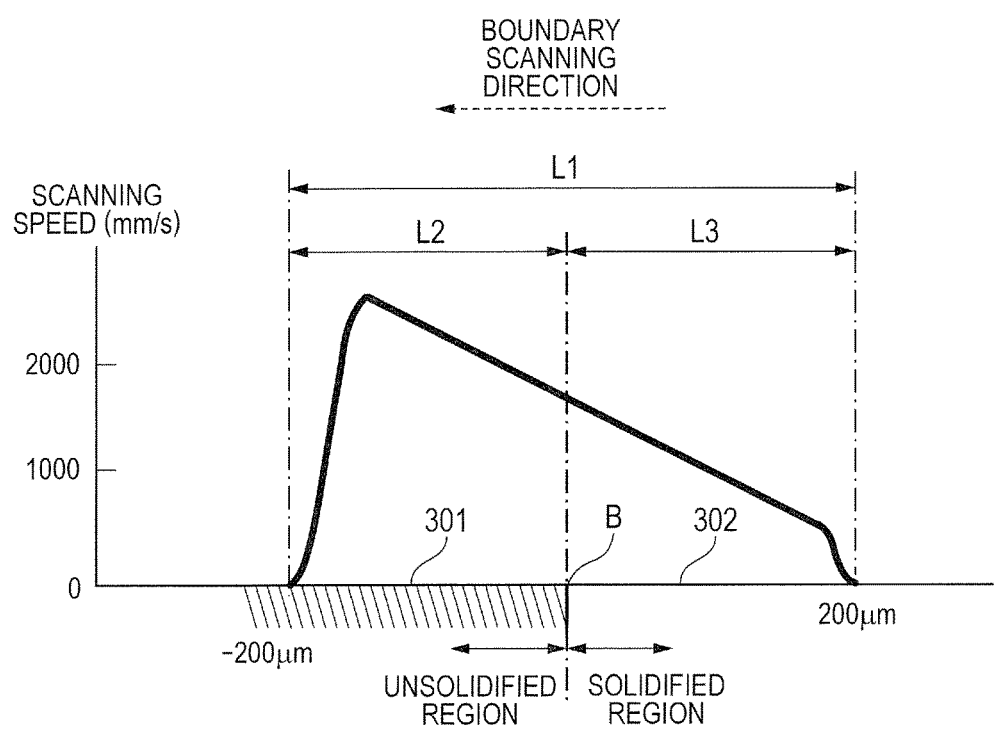
FIG. 8 is an explanatory diagram for illustrating setting of a moving speed of a laser beam in an example 1.
Figure 9A:
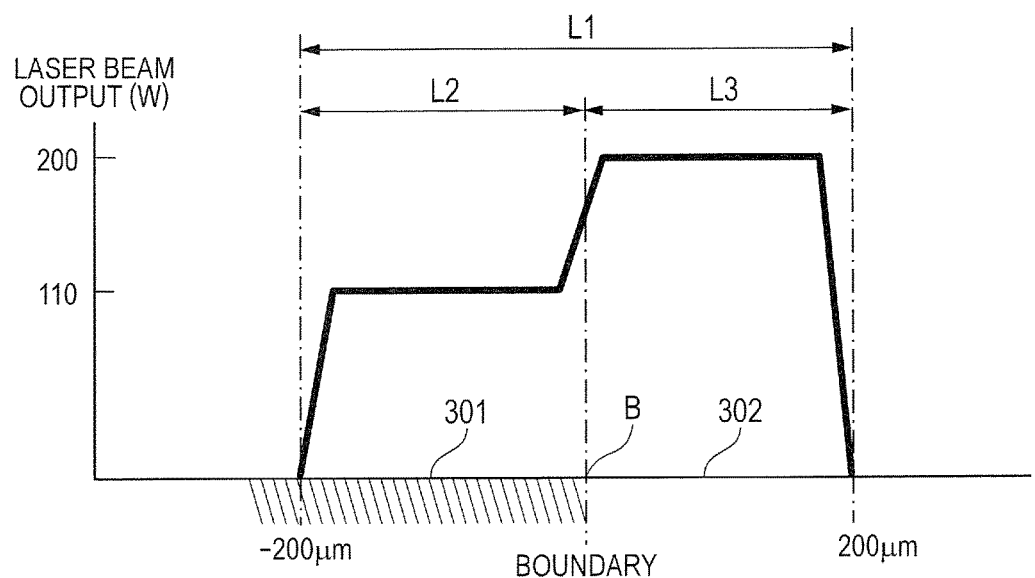
FIGS. 9A and 9B are explanatory diagrams of setting of output of laser beams in examples 2 and 3. More specifically.

As illustrated in FIG. 7, in the examples 1, 2, 3 and 4, the optical system (107: FIG. 1) was adjusted so that the beam spot diameter of the laser beam 109 was about 80 μm at the surface position of the layer 132. The main-scanning speed was 200 mm/sec, and the scanning pitch 111 was 200 μm. The boundary scan heating was performed by performing the scanning of the laser beam 109 perpendicular to the main scanning, and the scanning width (peak-to-peak distance) of the boundary scan heating was 400 μm. The scanning width of the boundary scan heating was set so that the maximum distance of the irradiation trace of the laser beam 109 was about 400 μm while observing the irradiation trace by experimentally performing the boundary scan heating with another metal plate in advance. As illustrated in FIGS. 8 and 9A, in the examples 1, 2 and 3, the scanning width L1 of the boundary scan heating was 400 μm, the heating width L3 of the solidified region 302 was 200 μm, and the heating width L2 of the unsolidified region 301 was 200 μm.

In the examples 1, 2, 3 and 4, in case of performing the boundary scan heating to the solidified region 302 and the unsolidified region 301 by the laser beam 109, the output of the laser beam 109 is reduced at the maximum amplitude position of the scanning in the unsolidified region 301 and the vicinity of the relevant position. The range of the vicinity which centers the maximum amplitude position corresponds to the beam spot size of the laser beam 109, and the output of the laser beam 109 at the maximum amplitude position is 0.

The scanning speed in the boundary scan heating is at both the ends of the maximum amplitude, and an acceleration/deceleration region adjacent to the position of the maximum amplitude is set. At the position of the maximum amplitude of the boundary scan heating, since the moving speed of the beam spot 110 becomes 0 as the moving direction is reversed and thus the heating energy per unit area becomes excessive, the output of the laser beam 109 is decreased to "0 W (zero watt)" (see FIG. 9A).

Example 1

FIG. 8 is the explanatory diagram for illustrating setting of the moving speed of the laser beam in the example 1. As illustrated in FIG. 8, in the example 1, the moving speed of the laser beam 109 in the unsolidified region 301 during the boundary scan heating is higher than the moving speed of the laser beam 109 in the solidified region 302. The average speed of the boundary scan heating in the unsolidified region 301 was set to 2000 mm/sec, and the average speed of the boundary scan heating in the solidified region 302 was set to 1300 mm/sec.

In the unsolidified region 301, since the beam is moved the distance of reciprocatory 400 μm at the average speed of about 2000 mm/sec, one reciprocation movement time in the unsolidified region 301 is about 200 μsec. The movement distance of the beam spot 110 in the main-scanning direction during the movement time of 200 μsec is 40 μm. On the other hand, in the solidified region 302, similarly, since the beam is moved the distance of reciprocatory 400 μm at the average speed of about 1300 mm/sec, one reciprocation movement time in the solidified region 302 is about 308 μsec. The movement distance of the beam spot 110 in the main-scanning direction during the movement time of 308 μsec is 62 μm.

In the example 1, the amplitude of the boundary scan heating in the unsolidified region 301 is equal to that in the solidified region 302, and the output of the laser beam 109 in the unsolidified region 301 is equal to that in the solidified region 302. Therefore, the heating amount in each of the unsolidified region 301 and the solidified region 302 is proportional to the main-scanning distance in each of the regions. For this reason, the heating amount per unit area for the unsolidified region 301 is 40/62, i.e., about 65%, of the heating amount per unit area for the solidified region 302.

The heating amount in each of the unsolidified region 301 and the solidified region 302 is proportional to the main-scanning time in each of the regions. Therefore, the heating amount per unit time for the unsolidified region 301 is 200/308, i.e., 65%, of the heating amount per unit time for the solidified region 302.

Example 2

Figure 9B:
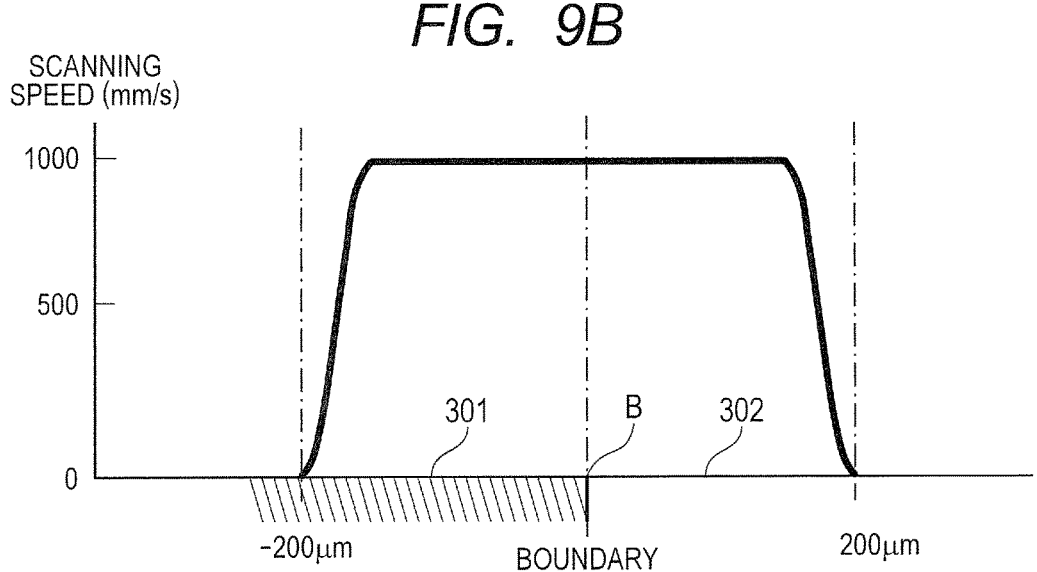

FIGS. 9A and 9B are explanatory diagrams of setting of the output of the laser beams in the examples 2 and 3. More specifically, FIG. 9A is the diagram for illustrating the laser beam output, and FIG. 9B is the diagram for illustrating the scanning speed of the laser beam for the boundary scan heating. Incidentally, the horizontal axis of each diagram indicates the position of the boundary scan heating in the scanning direction, the unsolidified region 301 is arranged on the left side in the diagram, the solidified region 302 is arranged on the right side in the diagram, and a boundary B between the unsolidified and solidified regions is arranged at the center of the diagram.

As illustrated in FIG. 9B, in the example 2, except for the acceleration/deceleration region, the scanning speed for the boundary scan heating was set to 1000 mm/sec. The scanning speed of the boundary scan heating is 0 at both the ends of the maximum amplitude, and is 1000 mm/sec throughout the unsolidified region 301 and the solidified region 302 in the maximum amplitude.

As illustrated in FIG. 9A, the output of the laser beam 109 in the unsolidified region 301 is smaller than the output of the laser beam 109 in the solidified region 302. Except for both the ends of the maximum amplitude, the output of the laser beam 109 in the unsolidified region 301 was 110 W, and the output of the laser beam 109 in the solidified region 302 was 200 W.

In the example 2, since the scanning speed, the pitch and the area of the boundary scan heating are equal between the unsolidified region 301 and the solidified region 302, the heating amount per unit area of the laser beam 109 is proportional to the laser beam output. Since the output ratio of the laser beam 109 in the unsolidified region 301 and the solidified region 302 is 110 W/200 W, the heating amount per unit area of the unsolidified region 301 is about 55% of the heating amount per unit area of the solidified region 302.

In the example 2, since the area of the boundary scan heating and the irradiation time of the laser beam 109 are equal between the unsolidified region 301 and the solidified region 302, also the heating amount per unit time of the laser beam 109 is proportional to the laser beam output. Since the output ratio of the laser beam 109 in the unsolidified region 301 and the solidified region 302 is 110 W/200 W, also the heating amount per unit time of the unsolidified region 301 is about 55% of the heating amount per unit time of the solidified region 302.

Example 3

In the example 3, the main-scanning speed was set to 100 mm/sec being half of that in the example 2, and also the average speed of the boundary scan heating was set to 500 mm/sec being half of that in the example 2 (see FIG. 7).

In the example 3, the output of the laser beam 109 in the unsolidified region 301 is smaller than the output of the laser beam 109 in the solidified region 302. FIG. 9A indicates the output of the laser beam in the example 2. In the example 3, except for the maximum amplitude positions at both the ends, the output of the laser beam 109 in the unsolidified region 301 was set to 50 W, and the output of the laser beam 109 in the solidified region 302 was set to 80 W.

In the example 3, since the scanning speed, the pitch and the area of the boundary scan heating are equal between the unsolidified region 301 and the solidified region 302, the heating amount per unit area of the laser beam 109 is proportional to the laser beam output. Since the output ratio of the laser beam 109 in the unsolidified region 301 and the solidified region 302 is 50 W/80 W, the heating amount per unit area of the unsolidified region 301 is about 63% of the heating amount per unit area of the solidified region 302.

In the example 3, since the area of the boundary scan heating and the irradiation time of the laser beam 109 are equal between the unsolidified region 301 and the solidified region 302, also the heating amount per unit time of the laser beam 109 is proportional to the laser beam output. Since the output ratio of the laser beam 109 in the unsolidified region 301 and the solidified region 302 is 50 W/80 W, also the heating amount per unit time of the unsolidified region 301 is about 63% of the heating amount per unit time of the solidified region 302.

Example 4

Figure 10A:
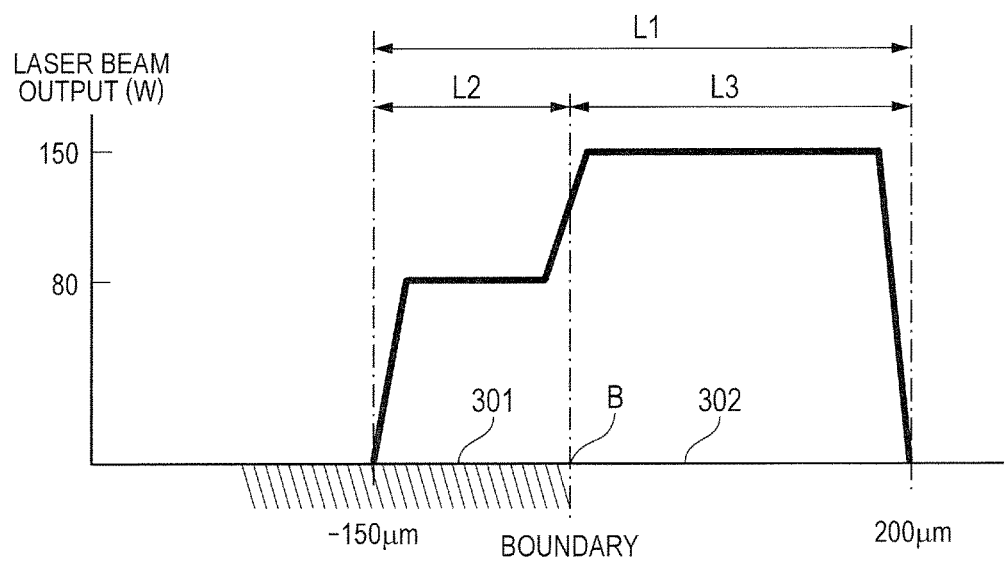
FIGS. 10A and 10B are explanatory diagrams of setting of output of a laser beam in an example 4. More specifically.
Figure 10B:
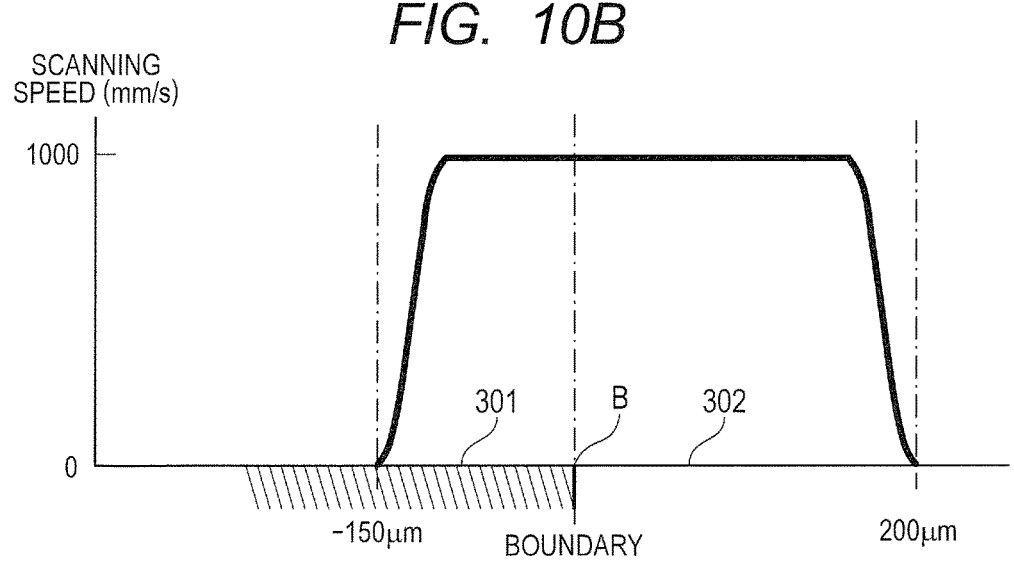

FIGS. 10A and 10B are explanatory diagrams of setting of the output of the laser beam in the example 4. More specifically, FIG. 10A is the diagram for illustrating the laser beam output, and FIG. 10B is the diagram for illustrating the scanning speed of the laser beam for the boundary scan heating. In the example 4, the main-scanning speed was set to 200 mm/sec, and the scanning pitch 111 was set to 150 µm (see FIG. 7). Besides, as illustrated in FIG. 10B, the scanning speed for the boundary scan heating was set to 1000 mm/sec, and the scanning width was set to 400 µm. However, in the example 4, the scanning width L1 of the boundary scan heating was set to 400 µm, the heating width L3 of the solidified region 302 was set to 250 µm, and the heating width L2 of the unsolidified region 301 was set to 150 µm.

As illustrated in FIG. 10A, in the example 4, the output of the laser beam 109 in the unsolidified region 301 is smaller than the output of the laser beam 109 in the solidified region 302. Except for the maximum amplitude positions at both the ends, the output of the laser beam 109 in the unsolidified region 301 was set to 80 W, and the output of the laser beam 109 in the solidified region 302 was set to 150 W.

In the example 4, since the scanning speed, the pitch and the area of the boundary scan heating are equal between the unsolidified region 301 and the solidified region 302, the heating amount per unit area of the laser beam 109 is proportional to the laser beam output. Since the output ratio of the laser beam 109 in the unsolidified region 301 and the solidified region 302 is 80 W/150 W, the heating amount per unit area of the unsolidified region 301 is about 55% of the heating amount per unit area of the solidified region 302.

On the other hand, in the example 4, the amplitude of the unsolidified region 301 is set to 150 µm, and the amplitude of the solidified region 302 is set to 250 µm. Therefore, the heating time of the unsolidified region 301 is 150 µm÷1000 mm/sec=150 µsec, and the heating time of the solidified region 302 is 250 µm÷1000 mm/sec=250 µsec.

Hereby, the heating amount per unit time of the unsolidified region 301 is (80 W/150 W)×(150 µsec/250 µsec)=about 33% to the heating amount per unit time of the solidified region 302 (including the difference of the laser beam output).

Comparative Example 1

In the comparative example 1, as illustrated in FIG. 4B, the laser heating step is performed in the main scanning and the sub scanning. The laser beam output was set to 50 W, the main-scanning speed was set to 200 mm/sec, and the scanning pitch was set to 40 µm. The other conditions were set to be equal to those in the examples 1 and 2.

Comparative Example 2

In the comparative example 2, under the condition of the comparative example 1, the laser beam output was set to 200 W, the scanning pitch was set to 200 µm, and the main-scanning speed was set to 200 mm/sec.

(Experimental Results)

As indicated in Table 1, the product manufactured object 133 was manufactured under each of the above conditions of the examples 1, 2, 3 and 4 and the comparative examples 1 and 2. Then, after 50 hours from the start of the manufacturing, transmittance for infrared light having the wavelength of 1070 nm of the transmission window 108 was measured.

TABLE 1

| | Laser beam output (W) | | Boundary scanning speed (mm/sec) | | Boundary scanning amplitude (μm) | Main-scanning speed (mm/sec) | Main-scanning pitch (μm) |
|---|---|---|---|---|---|---|---|
| | Unsolidified region | Solidified region | Unsolidified region | Solidified region | | | |
| Example 1 | 200 | | 2000 | 1300 | 400 | 200 | 200 |
| Example 2 | 110 | 200 | 1000 | | 400 | 200 | 200 |
| Example 3 | 50 | 80 | 500 | | 400 | 100 | 200 |
| Example 4 | 80 | 150 | 1000 | | 400 | 200 | 150 |
| Comparative Example 1 | 50 | | 0 | | 0 | 200 | 40 |
| Comparative Example 2 | 200 | | 0 | | 0 | 200 | 200 |

As indicated in Table 2, the lowering states of the transmittance of the transmission window 108 under the conditions of the examples 1, 2, 3 and 4 and the comparative examples 1 and 2 were compared. Incidentally, the transmittance of the transmission window 108 at the wavelength of 1070 nm before the start of manufacturing is 92%.

TABLE 2

| | Transmittance (%) | | | Heating amount ratio per unit area (unsolidified region/solidified region) | Heating amount ratio per unit time (unsolidified region/solidified region) |
|---|---|---|---|---|---|
| | Before manufacturing | After 50 hours | Difference | | |
| Example 1 | 92 | 86 | 6 | 0.65 | 0.65 |
| Example 2 | 92 | 89 | 3 | 0.55 | 0.55 |
| Example 3 | 92 | 90 | 2 | 0.63 | 0.63 |
| Example 4 | 92 | 87 | 5 | 0.55 | 0.33 |
| Comparative Example 1 | 92 | 80 | 12 | 1 | 1 |
| Comparative Example 2 | 92 | 81 | 11 | 1 | 1 |

As indicated in Table 2, in the examples 1, 2, 3 and 4, the transmittance was as high as 86% to 90% even after 50 hours from the start of manufacturing. In contrast, in the comparative examples 1 and 2, the transmittance greatly decreased to 80% to 81%. Therefore, in the examples 1, 2, 3 and 4, it was confirmed that generation of the fume, which causes a decrease in transmittance, was small.

Effect of First Embodiment

In the first embodiment, the boundary scan heating is performed to the solidified region 302 and the unsolidified region 301 by using the laser beam 109, thereby fusing the material powder 131 of the adjacent unsolidified region 301 while fusing the solidified region 302. Therefore, it is possible to re-fuse the solidified region 302, highly integrate the solidified region with the unsolidified region 301, and thus manufacture the product manufactured object 133 with a dense structure with less disorder of the tissue due to a heating failure.

In the first embodiment, when performing the boundary scan heating to the solidified region 302 and the unsolidified region 301, the heating energy per unit area to be supplied to the unsolidified region 301 is set to be smaller than the heating energy per unit area to be supplied to the solidified region 302. Therefore, it is possible to suppress overheating and evaporation of the material powder 131 in the unsolidified region 301, and to reduce the generation amount of the fume. Hereby, it is possible to avoid fume attachment contamination to the transmission window 108 of the container 101 and scattering of the laser beam 109 in the container 101, and thus to stably maintain the state of the laser beam 109 reaching the layer 132 of the material powder 131 for a long time.

In the first embodiment, the boundary scan heating of alternately heating the solidified region 302 and the unsolidified region 301 by the laser beam 109 is performed, thereby fusing and solidifying these regions integrally. Therefore, it is possible to manufacture or form the dense and rigid product manufactured object 133 with little unevenness due to a heating failure.

In the first embodiment, the boundary scan heating is performed such that the heating amount per unit area of the unsolidified region 301 is smaller than the heating amount per unit area of the solidified region 302. Therefore, it is possible to avoid overheating of the unsolidified region 301, and to suppress the generation amount itself of the fume due to the heating of the unsolidified region 301.

In the first embodiment, the boundary scan heating is performed so as to continuously irradiate the solidified region 302 and the unsolidified region 301. Therefore, it is possible to efficiently heat the boundary region between the solidified region 302 and the unsolidified region 301. In addition, it is possible to increase productivity of the three-dimensional manufacturing by increasing the heating amount per unit time.

In the first embodiment, the boundary scan heating is performed so as to reduce the output of the laser beam 109 at the maximum amplitude position of the scanning in the unsolidified region 301 and its vicinity. Therefore, even if the movement direction of the beam spot 110 is reversed in the boundary scan heating, it is possible to prevent instantaneous excessive heating from being caused by the beam spot 110 stopping on the unsolidified region 301.

In the first embodiment, the vicinity range centering on the maximum amplitude position of the boundary scan heating corresponds to the beam spot size of the laser beam 109, and the output of the laser beam 109 at the maximum amplitude position is 0. Therefore, variations in the heating amount per unit time of the unsolidified region 301 are reduced before and after the reversal of the moving direction of the beam spot 110 and at other timings.

Second Embodiment

In the examples 2, 3 and 4, by increasing the output of the laser beam over the entire solidified region excluding the maximum amplitude position of the boundary scan heating, the heating amount necessary for fusing the solidified region was secured. On the other hand, in the second embodiment, the heating amount necessary for fusing the solidified region is secured by utilizing the decrease (stop) of the scanning speed of the laser beam at the maximum amplitude position of the boundary scan heating.

(Overheating at Maximum Amplitude Position)

Figure 11A:
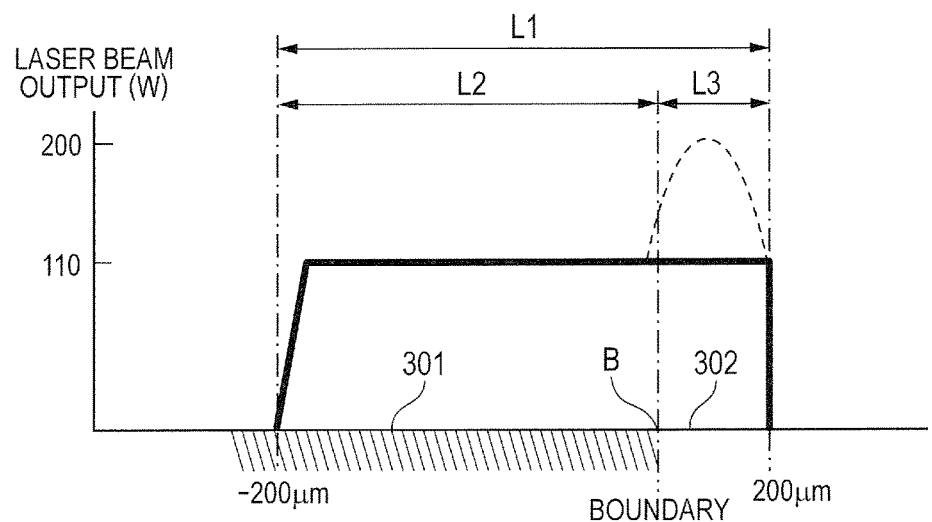
FIGS. 11A and 11B are explanatory diagrams of boundary scan heating according to the second embodiment. More specifically.
Figure 11B:
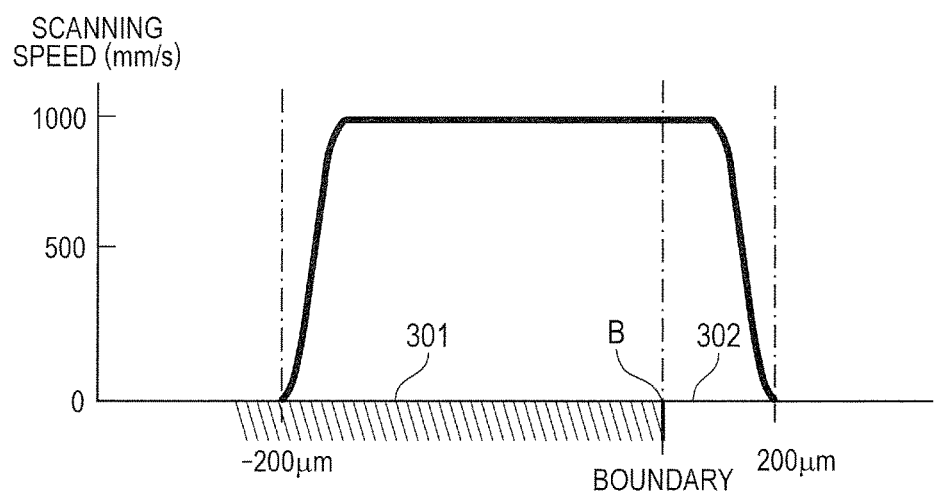

FIGS. 11A and 11B are explanatory diagrams of boundary scan heating according to the second embodiment. More specifically, FIG. 11A is the diagram for illustrating the laser beam output, and FIG. 11B is the diagram for illustrating the scanning speed of the laser beam for the boundary scan heating.

As illustrated in FIG. 11B, at the maximum amplitude position of the boundary scan heating, the movement speed of the beam spot decreases, and the heating amount per unit area increases. Therefore, as illustrated in FIG. 11A, at the maximum amplitude position of the unsolidified region 301, the laser beam output is lowered in the same manner as in the examples 2, 3 and 4 to avoid overheating of the material powder 131, thereby suppressing generation of fume. On the other hand, at the maximum amplitude position of the solidified region 302, the laser beam output is maintained, so that an increase in the heating amount per unit area equivalent to an increase in the laser beam output as indicated by the broken line is generated. Further, a distance smaller than the diameter of the beam spot 110 of the laser beam 109 is set within the range of the boundary scan heating of the solidified region 302, in correspondence with such an increase range of the heating amount per unit area.

In the second embodiment, the laser beam 109 is controlled such that the irradiation area of the laser beam 109 in the unsolidified region 301 is larger than the irradiation area of the laser beam 109 in the solidified region 302. Hereby, the heating energy allocated for the re-fusing in the solidified region 302 is saved, and the heating energy allocated for fusing the material powder 131 in the unsolidified region 301 is increased. As a result, it is possible to increase the area of the unsolidified region 301 to be fused along with one main scanning, and thus to increase productivity of the three-dimensional manufacturing. Besides, it is possible to increase productivity of the three-dimensional manufacturing while saving the power consumption in the laser heating step.

Other Embodiments

The three-dimensional manufacturing method and the three-dimensional manufacturing apparatus according to the present invention are not limited to the specific constitutions, the part forms and the actual sizes in the first embodiment. Namely, the present invention can be carried out in another embodiment in which a part or the whole of the constitution of the first embodiment is replaced with equivalent member(s). Therefore, the beam spot size of the laser beam 109 of the energy beam, the laser beam output, the laser beam irradiation position, the manufacturing container, and the material powder layer forming apparatus can be changed to desired specifications. The material powder 131 is not limited to stainless steel particles. Namely, titanium, iron, aluminum, silicon, metal carbide, metal nitride, metal oxide, ceramic particles and the like can be freely selected. Also, the gas to be introduced into the container 101 can be arbitrarily changed. For example, introducing a mixed gas in which hydrogen gas is mixed with nitrogen gas, argon gas and/or the like and performing manufacturing in a reductive atmosphere also has an effect of increasing strength for the product manufactured object. It may be possible to heat the material powder to a temperature lower than the fusing temperature to sinter the relevant material powder, thereby performing the three-dimensional manufacturing.

In the first embodiment, the manufacturing region of each layer is solidified by the raster scanning method in which the main scanning is stacked in the sub-scanning direction. However, the energy beam movement other than the raster scanning method may be adopted. Namely, spiral movement, swirling (spiral) movement from the center to the contour, swirling movement from the contour to the center, or the like may be adopted.

In the first embodiment, the scanning speed or laser beam output of the boundary scan heating for the boundary scan heating was made different for the solidified region 302 and the unsolidified region 301. However, for both the solidified region 302 and the unsolidified region 301, both the scanning speed and the laser beam output for the boundary scan heating may be made to be different in parallel at the same time.

In the first embodiment, the scanning direction of the boundary scan heating is set in the direction perpendicular to the main-scanning direction. However, it may be possible to set the scanning direction of the boundary scan heating to a direction other than the direction perpendicular to the main-scanning direction. Besides, the method of alternately heating the solidified region and the unsolidified region while moving the laser beam is not limited to the raster scanning. Namely, it may be possible to perform plane-spiral-curved laser beam movement of shifting little by little a circular orbit, an elliptical orbit or a polygonal orbit on a plane and thus moving it.

In the first embodiment, the laser beam of the semiconductor laser having the wavelength of 1070 nm is used as the energy beam. However, it may be possible to replace the energy beam with a laser beam having another wavelength, a laser beam of another oscillation source, or an electron beam. However, when the electron beam is used, the container 101 illustrated in FIG. 1 needs to maintain a low pressure state by drawing a high degree of vacuum.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-073538, filed Mar. 31, 2016, which is hereby incorporated by reference herein in its entirety.

What is claimed is:

1. A three-dimensional manufacturing method comprising:
    a layer forming step of causing a controlling unit to form a layer of a material powder; and
    a heating step of causing the controlling unit to alternately move an energy beam on a solidified region obtained by fusing and solidifying the layer formed in the layer forming step and on a powder region in which the material powder is not fused, the powder region being adjacent to the solidified region, thereby integrally fusing and solidifying the solidified region and the powder region,
    wherein, in the heating step, a heating amount of the energy beam per unit area of the powder region is smaller than a heating amount of the energy beam per unit area of the solidified region.

2. The three-dimensional manufacturing method according to claim 1, wherein, in the heating step, the controlling unit continuously irradiates the solidified region and the powder region, and an average movement speed of the energy beam in the powder region is higher than an average movement speed of the energy beam in the solidified region.

3. The three-dimensional manufacturing method according to claim 1, wherein, in the heating step, the controlling unit continuously irradiates the solidified region and the powder region, and an average output of the energy beam in the powder region is smaller than an average output of the energy beam in the solidified region.

4. The three-dimensional manufacturing method according to claim 1, wherein, in the heating step, the controlling unit scans the solidified region and the powder region with the energy beam, and controls to make an output of the energy beam smaller at a maximum amplitude position of the scan and its vicinity in the powder region.

5. The three-dimensional manufacturing method according to claim 4, wherein a range of the vicinity centering on the maximum amplitude position corresponds to a beam spot size of the energy beam.

6. The three-dimensional manufacturing method according to claim 4, wherein the output of the energy beam at the maximum amplitude position is 0.

7. A three-dimensional manufacturing method which is to perform three-dimensional manufacturing by repeating a step of forming a solidified layer by irradiating an energy beam to a manufacturing material on a manufacturing table, the method comprising:
    a layer forming step of forming a layer of the manufacturing material on the manufacturing table; and
    a heating step of alternately moving an energy beam on a solidified region formed by fusing and solidifying, with the irradiating of the energy beam, the layer formed in the layer forming step and on a powder region in which the manufacturing material is not fused, the powder region being adjacent to the solidified region, thereby integrally fusing and solidifying the solidified region and the powder region,
    wherein, in the heating step, a heating amount of the energy beam per unit area of the powder region is smaller than a heating amount of the energy beam per unit area of the solidified region.

8. A three-dimensional manufacturing apparatus comprising:
    a layer forming unit configured to form a layer of material powder;
    a heating unit configured to heat, with a laser beam, the layer formed by the layer forming unit; and
    a controlling unit configured to cause the layer forming unit to form the layer, and to cause the heating unit to heat the layer,
    wherein the controlling unit is configured to cause the energy beam to move alternately on a solidified region obtained by fusing and solidifying the layer and on a powder region in which the material powder is not fused, the powder region being adjacent to the solidified, thereby integrally fusing and solidifying the solidified region and the powder region, and
    wherein a heating amount of the energy beam per unit area of the powder region is smaller than a heating amount of the energy beam per unit area of the solidified region.

9. A three-dimensional manufacturing apparatus which performs three-dimensional manufacturing by repeating a step of forming a solidified layer by irradiating an energy beam to a manufacturing material on a manufacturing table, the apparatus comprising:
    a layer forming unit configured to form a layer of the manufacturing material on the manufacturing table;
    a heating unit configured to heat, by irradiating the energy beam, the layer formed by the layer forming unit; and
    a controlling unit configured to control the irradiating of the energy beam to the layer formed by the layer forming unit,
    wherein the controlling unit is configured to control the heating unit to alternately move the energy beam on a solidified region formed by fusing and solidifying, with the irradiating of the energy beam, the layer and on a powder region in which the manufacturing material is not fused, the powder region being adjacent to the solidified, thereby integrally fusing and solidifying the solidified region and the powder region, and
    wherein a heating amount of the energy beam per unit area of the powder region is smaller than a heating amount of the energy beam per unit area of the solidified region.

* * * * *